United States Patent
Perkins et al.

(10) Patent No.: US 8,660,020 B2
(45) Date of Patent: Feb. 25, 2014

(54) COMMUNICATION NETWORK WITH SKEW COMPENSATION

(75) Inventors: Drew D. Perkins, Saratoga, CA (US);
David F. Welch, Atherton, CA (US);
Ting-Kuang Chiang, Saratoga, CA (US); Edward E. Sprague, Woodside, CA (US); Parthiban Kandappan, San Jose, CA (US); Stephen G. Grubb, Reisterstown, MD (US); Prasad Paranjape, Fremont, CA (US)

(73) Assignee: Infinera Corporation, Sunnyvale, CA (US)

( * ) Notice: Subject to any disclaimer, the term of this patent is extended or adjusted under 35 U.S.C. 154(b) by 587 days.

(21) Appl. No.: 11/871,934

(22) Filed: Oct. 12, 2007

(65) Prior Publication Data
US 2008/0175586 A1 Jul. 24, 2008

Related U.S. Application Data

(60) Provisional application No. 60/885,832, filed on Jan. 19, 2007.

(51) Int. Cl.
*H04J 1/16* (2006.01)

(52) U.S. Cl.
USPC ............... 370/252; 398/158; 398/43

(58) Field of Classification Search
USPC ............. 398/25–27, 45, 81, 147, 158, 29, 33, 398/58, 66, 68, 74, 177; 370/229, 230, 235, 370/241, 242, 252, 253
See application file for complete search history.

(56) References Cited

U.S. PATENT DOCUMENTS

| | | | |
|---|---|---|---|
| 7,149,432 B1 * | 12/2006 | Smith et al. | 398/158 |
| 2002/0005968 A1 | 1/2002 | Suzuki | |
| 2007/0147434 A1 | 6/2007 | Toyoda | |

FOREIGN PATENT DOCUMENTS

| | | |
|---|---|---|
| EP | 0 438 022 | 7/1991 |
| WO | WO 2006/106973 | 10/2006 |

OTHER PUBLICATIONS

Hidehiro Toyoda et al., "A 100-Gb-Ethernet subsystem for next-generation metro-area network", 2005 IEEE International Conference, Seoul Korea, May 16-20, 2005, pp. 1036-1042.
Written Opinion of the International Searching Authority in PCT Application No. PCT/US2008/079645.

* cited by examiner

*Primary Examiner* — Dady Chery
(74) *Attorney, Agent, or Firm* — North Weber & Baugh LLP; David L. Soltz

(57) ABSTRACT

Embodiments of the present invention compensate for skew across a wavelength division multiplexed network. The network is a wavelength division multiplexed optical transport network. The skew compensation can be performed electrically or optically. It can be performed on the transmission side of the network, the receiver side of the network or at any intermediary node on the network.

6 Claims, 14 Drawing Sheets

COMMUNICATION NETWORK WITH SKEW COMPENSATION

CROSS REFERENCE TO RELATED PATENT APPLICATIONS

This application is related to U.S. Provisional Application Ser. No. 60/885,832, entitled "Communication Network with Skew Path Factoring," filed Jan. 19, 2007; U.S. application Ser. No. 11/781,912, filed on Jul. 23, 2007 entitled "Communication Network With Skew Path Monitoring and Adjustment;" and U.S. application Ser. No. 11/856,692, filed on Sep. 17, 2007, entitled "Communication Network With Skew Determination;" all of which are incorporated herein by reference in their entirety.

BACKGROUND

A. Technical Field

This invention relates generally to optical transport networks, and more particularly to the management of skew across a wave division multiplexed network.

B. Background of the Invention

Optical networks are able to communicate information at high data rates. An optical transport system 10 is shown in FIG. 1, with multiple intermediate nodes and routes 16 between source 12 and destination 14. Nodes n1-n6 in a network are provided as an exemplary network with spatial diversity in the span, or segments separating nodes, e.g., across a geographic area. Multiple communication paths between a source node and destination node are provided across the network. The transport system might consider the route length, the traffic load, the route cost, latency property, and ability to compensate for skew, among other factors, for a given signal when choosing a path within the network on which to transport the signal. For example, a high quality of service ("QoS") request might require a given signal be transported on a route between a source and a destination with the lowest amount of latency. Alternatively, as traffic data rates continue to mushroom, carriers typically resort to routing signals on alternative and/or relatively higher latency paths, which often times span a longer overall distance than the preferred path. Additionally, these longer paths typically have more nodes, which usually translates into compromised timing properties for the signal at the receiver.

SUMMARY OF THE INVENTION

Embodiments of the present invention compensate for skew between multiple paths in an optical network. The network can be a wave division multiplexed ("WDM") optical transport network using wavelength division multiplexed wavelengths and/or optical carrier groups ("OCGs") over a fiber link to another node in the network. The plurality of communication paths involve different signal and path attributes such as a plurality of carrier wavelengths, optical carrier groups, physical communication paths (different nodes, different fibers along a same path, or any combination of the foregoing), or any other differentiating factors between two paths.

In some embodiments of the present invention, skew compensation is accomplished on the transmission side of the network prior to transmission. The skew compensation can be based at least in part on determined skew relative to the communication paths.

In certain other embodiments of the invention, skew compensation can be accomplished at the receiver side. The receiver side can base skew compensation, at least in part, on the determined skew relative to the communication paths.

In some embodiments, skew compensation can be performed electronically. In other embodiments, skew compensation can be performed optically. Skew compensation can also be performed at an intermediary node on a path between the transmitting and receiving sides. In certain embodiments, skew compensation performed at the intermediary node can involve selecting certain communication paths between the intermediary node and the receiver node such that skew on the communication paths between the intermediary node and the receiver compensates for the skew between the transmitting node and the intermediary node.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
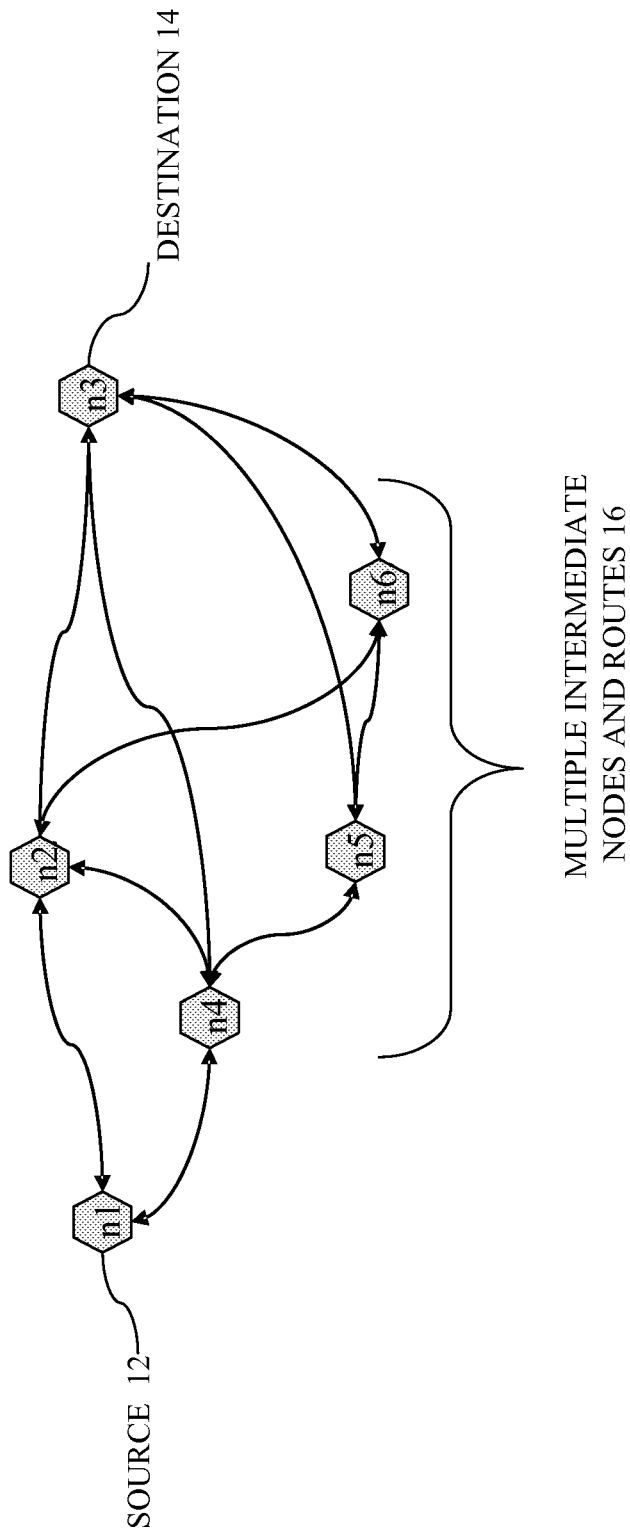
FIG. 1 is a schematic of an optical transport network, in accordance with various aspects of the present invention.
Figure 2:
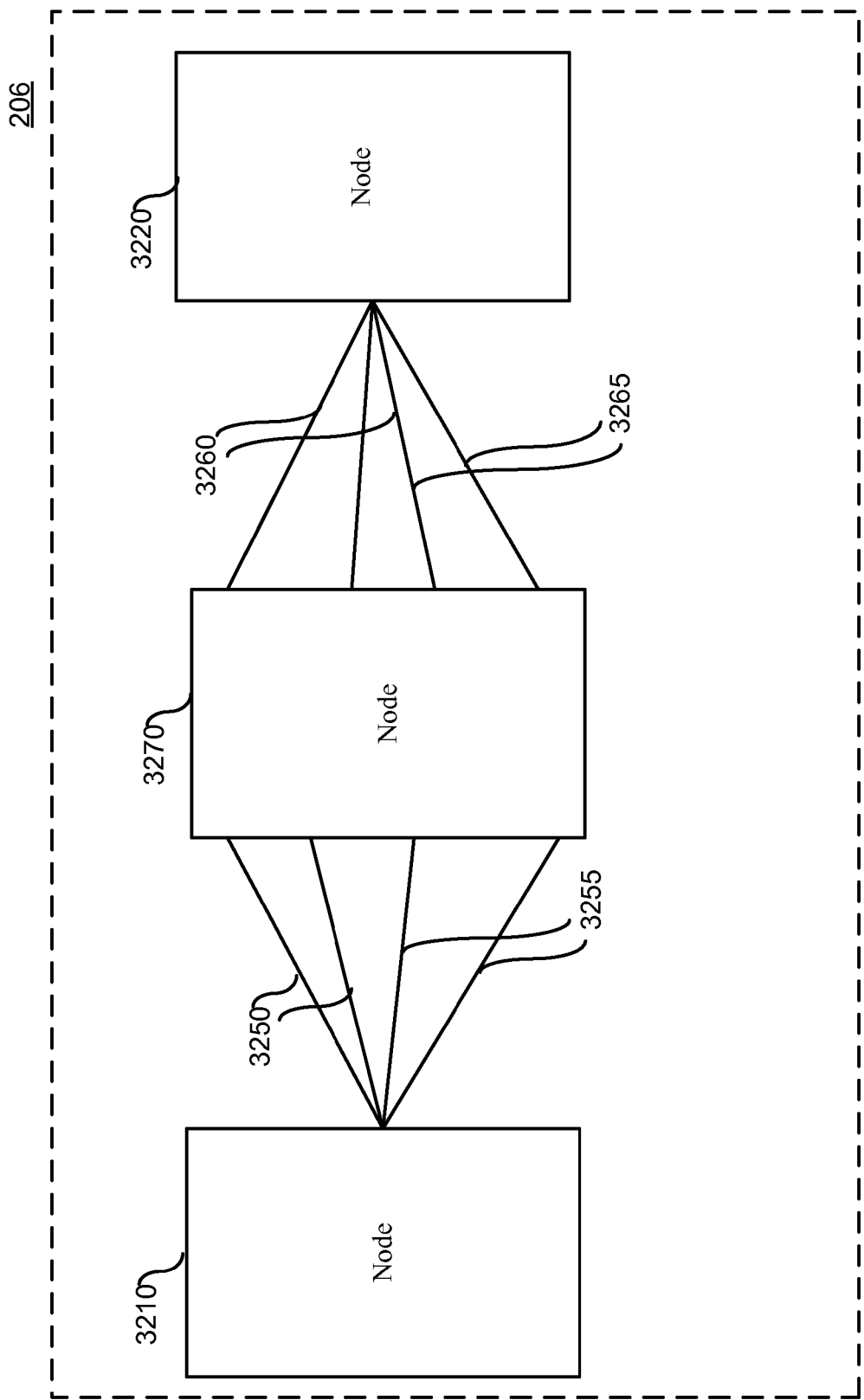
FIG. 2 is a block diagram of a communication network that transmits a signal over multiple channels and through an intermediary node, in accordance with various aspects of the present invention.

FIG. 2 illustrates a portion of an exemplary networking system where communication bandwidth and Quality of Service ("QoS") can be increased by transporting information, such as a client signal, over multiple communication paths within the network system. Information is any data, such as content, control, overhead, metadata, redundant or protection data, correction data, etc. that is transported along a path in the network.

The portion of the networking system shown in FIG. 2 can, in various embodiments, incorporate portions of legacy communication networks along with additional control, methods and/or apparatus to enable the measurement, control, and/or adjustment of skew on the communication network as described in the present disclosure. A node in the networking system can be any node where transmitted information is managed, processed and/or signal performance is evaluated via measurement devices.

In accordance with certain embodiments of the invention, nodes can be traditional analog nodes, digital nodes, hybrid nodes that allow signal management, or any combination thereof. Analog nodes may be amplifiers, or regeneration nodes. Nodes can also be digital nodes, implementing an optical to electrical to optical translation ("OEO") such as described in case as disclosed and taught in U.S. patent application Ser. No. 10/267,331, filed Oct. 8, 2003, entitled "TRANSMITTER PHOTONIC INTEGRATED CIRCUITS (TxPIC) AND OPTICAL TRANSPORT NETWORKS EMPLOYING TxPICs" and in U.S. patent application Ser. No. 10/267,212, filed Oct. 8, 2002, entitled "DIGITAL OPTICAL NETWORK ('DON') ARCHITECTURE", and U.S. Pat. No. 7,116,851, issued Oct. 3, 2006, entitled "AN OPTICAL SIGNAL RECEIVER PHOTONIC INTEGRATED CIRCUIT (RxPIC), AN ASSOCIATED OPTICAL SIGNAL TRANSMITTER PHOTONIC INTEGRATED CIRCUIT (TxPIC) AND AN OPTICAL TRANSPORT NETWORK UTILIZING THESE CIRCUITS", all of which patent applications and patents are incorporated herein by reference. Reference to measuring signal performance can be implemented in either the electrical or optical domain.

Information can be transported as a signal or signals. FIG. 2 shows one example of communication between transmitting node 3210 and receiving node 3220 through intermediary node 3270.

Referring to FIG. 2, a signal routed from node 3210 to 3220 can be divided into a plurality of signal portions 3250 and 3255. One method of dividing a wave division multiplexed signal is to demultiplex the signal prior to transmission. This provides more flexibility for the network since each signal portion can be routed separately and then restored at the receiver node 3220. The signal portions can be routed on a plurality of different channels on a single or multiple communication paths. In one embodiment, each channel can be a carrier wavelength. The communication paths can be paths on a single fiber, paths through common intermediary nodes, e.g., intermediary node 3270, paths on different fibers or through different intermediary nodes.

FIG. 2 illustrates the signal divided into four signal portions 3250 and 3255, however, as understood by one of ordinary skill in the art, the signal can be divided into two or more signal portions. Once the signal has been divided, the divided signal portions 3250 and 3255 can be transported as different channels. The wavelengths can be transported as part of a group called a virtual super wavelength.

Each channel can be transported on a different communication path providing for added flexibility in routing the signals. Consequently, the networking system is not limited to selecting a path capable of transporting the entire signal since the signal is divided into multiple signal portions that can be transported separately. This improves QoS and permits higher bandwidth signal transportation over longer distances.

However, since the signal transported was divided prior to transmission, it must be combined at the receiving node 3220 to recreate the transported signal. In order for the original signal to be restored at the receiving node 3220, the skew between the channels 3260 and 3265 should be within a skew constraint. Skew may be defined as a variation relative to the initial timing of a component of a launched data signal or differential latency between the signal portions.

Skew can arise from many different causes depending upon the transmission medium and length over which information is communicated. For example, intrachannel skew and interchannel skew can arise because different wavelength carriers propagate at different rates. In particular, a high frequency carrier signal will generally take a relatively longer period of time to propagate along an identical length fiber as a lower frequency carrier signal. Skew can also arise because the different channels are transported on different paths. The paths may be of varying lengths or have varying numbers of intermediary nodes. Skew becomes an increasingly important consideration when routing signals on different paths because the skew can grow tremendously as a result of varying latencies between the paths.

One way to maintain skew at an acceptable level is by using skew compensation. Skew compensation can adjust the skew relative to at least two paths such that the skew is equalized. The skew adjustment can be implemented in many different ways. In one embodiment, the skew adjustment is accomplished using an electrical or an optical buffer. The buffer can be in the transmitting node 3210, the receiving node 3220 or any intermediary node, e.g. intermediary node 3270. In some embodiments skew compensation is accomplished using channel swapping. Channel swapping involves switching channels at intermediary node 3270 between transmitting node 3210 and receiving node 3220. The channel swapping can be based on the latency of each hop, for example the channel with the greatest latency on a first hop can be swapped with the channel with the least latency on a second hop.

As shown in FIG. 2, the latency associated with the hop between transmitting node 3210 and intermediary node 3270 on path 3250 and path 3255 can be determined using any technique to determine latency. The latency associated with the hop between intermediary node 3270 and receiving node 3220 on path 3260 and on path 3265 can also be determined. If the latency associated with path 3250 is less than the latency associated with path 3255 and the latency associated with path 3265 is less than the latency associated with path 3260, then the information communicated on path 3250 can be swapped to path 3265 at intermediary node 3270 and the information communicated on path 3255 can be swapped to path 3260 at intermediary node 3270. Thus, the latency associated with the overall path 3250 and 3265 will be comparable to the latency associated with overall path 3255 and 3260 between transmitting node 3210 and receiving node 3220.

Figure 3:
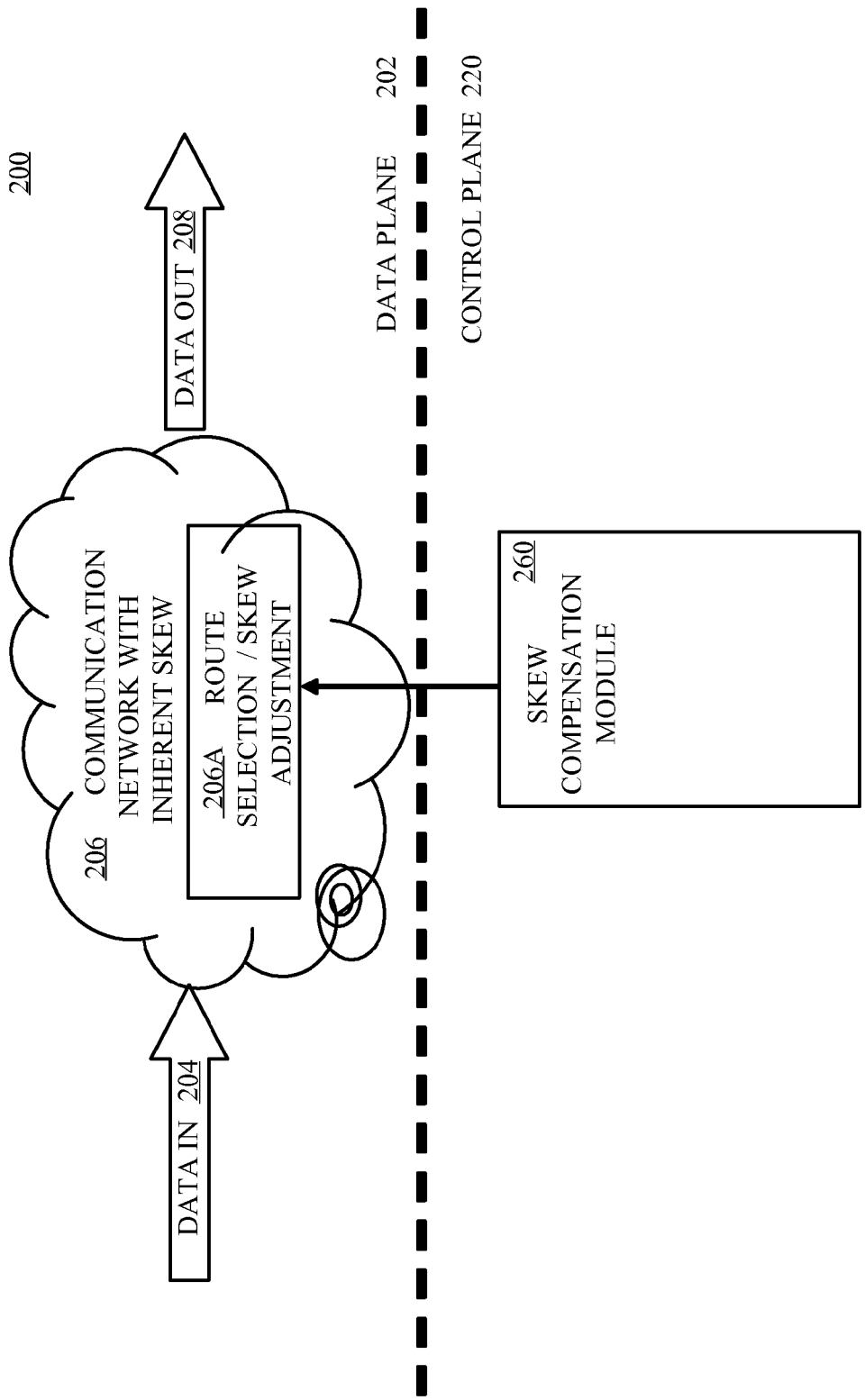
FIG. 3 is a functional block diagram of a communication network that compensates for skew, in accordance with various aspects of the present invention.

FIG. 3 illustrates a functional block diagram 200 of a communication network that considers skew data for routing information across a network in accordance with various aspects of the present invention. Ingress data 204 is provided to communication network 206 as client signals in the data plane 202 and is communicated to another node in the network and exits as client signal egress data 208 in the data plane 202. In a communication network using multiple communication paths to transport a signal as signal portions, skew should be addressed in order to avoid certain types of network failure events such as dropping signals, losing packets caused by overflowing a memory buffer and missing quality of service standards.

Embodiments of the present invention provide for route selection and skew adjustment 206A in communication network 206 via skew compensation module 260 in the control plane 220 of network 200. Skew adjustment is accomplished by skew compensation module 260.

There are a number of ways to compensate for skew or adjust skew, including, compensating for skew at the transmission node, at the receiver node, or at any or all intermediary nodes. Skew compensation can be achieved in the optical domain using one or more optical buffers, coils of fiber. Skew compensation can also be achieved in the electrical domain using one or more first-in-first-out ("FIFO") buffers. The size of the optical and electrical buffers can be adjusted. Skew compensation can also be accomplished using latency balancing which can be implemented as channel swapping. Latency balancing can involve a determination of the latency of various hops or spans within the network and balancing the latencies among the spans or hops.

The modules and functionality shown in the control plane of FIG. 3 can be accomplished centrally within the network, at each node in the network, or a combination thereof. A central network management station can include a controller, or microprocessor, with associated memory, I/O, and other hardware/software to enable the execution of logical instructions on input and output data. The network management station can be a UNIX box, or any other operating system suitable to accomplish the functions mentioned herein. Central network management station is linked to the nodes of the network system.

The present invention is well suited to any coupling arrangement, via any medium, to allow communication between the data and control planes in communication networks. The present invention may only link a portion of the nodes in parallel, which then could subsequently link a coupled series of nodes.

Alternatively, a distributed network management architecture could be employed. In particular, at least one node could have connectivity to another node (intranodal) to allow for the communication of resource status in the node for skew adjustment. The present invention is well suited to any form of connectivity that allows for distributed control for skew measurement, communication, status, control, and/or etc. to/from a node, e.g., by optical supervisory channel ("OSC"). A given gateway network element ("GNE") might have connectivity to multiple service network elements ("SNEs").

Alternatively, each node may have standalone skew measurement and correction capacities to simplify the required interaction between the nodes. The present invention is well suited to any combination of these or other control models that allow skew measurement and/or adjustment.

FIGS. 4A through 4D illustrate different skew routing and skew adjusting techniques that allow for improved efficiency, flexibility, and cost-effective skew management of information transmission through the network. An exemplary client signal to be transmitted on the networks 400A through 400D is demultiplexed into multiple channels to accommodate the size of the client signal. In this case, client signal is broken into multiple signal portions $C_1$-$C_4$ and communicated on network carrier frequencies, shown as $\lambda_1$, $\lambda_K$, $\lambda_L$, and $\lambda_M$, which are also referred to as a first virtual super wavelength ("VSW1A").

The quantity and frequency of channels within an OCG may vary in accordance with the network system and environment in which it operates. For example, an OCG may depend on the resources available on the network, the skew and traditional metric performances of the network, and a controller assigning the resources. The VSW1A is received and re-sequenced at the destination node (e.g. node N3) with acceptable skew performance, for reconstruction of the client signal and egress from the network. The information routing or skew adjustment described herein can be employed in combination or permutation with each other to provide additional options in routing and skew adjustment for the overall system. FIGS. 4A through 4D can be implemented in one embodiment employing hardware shown in FIGS. 5-7, and employing the process described in FIG. 11.

Figure 4A:
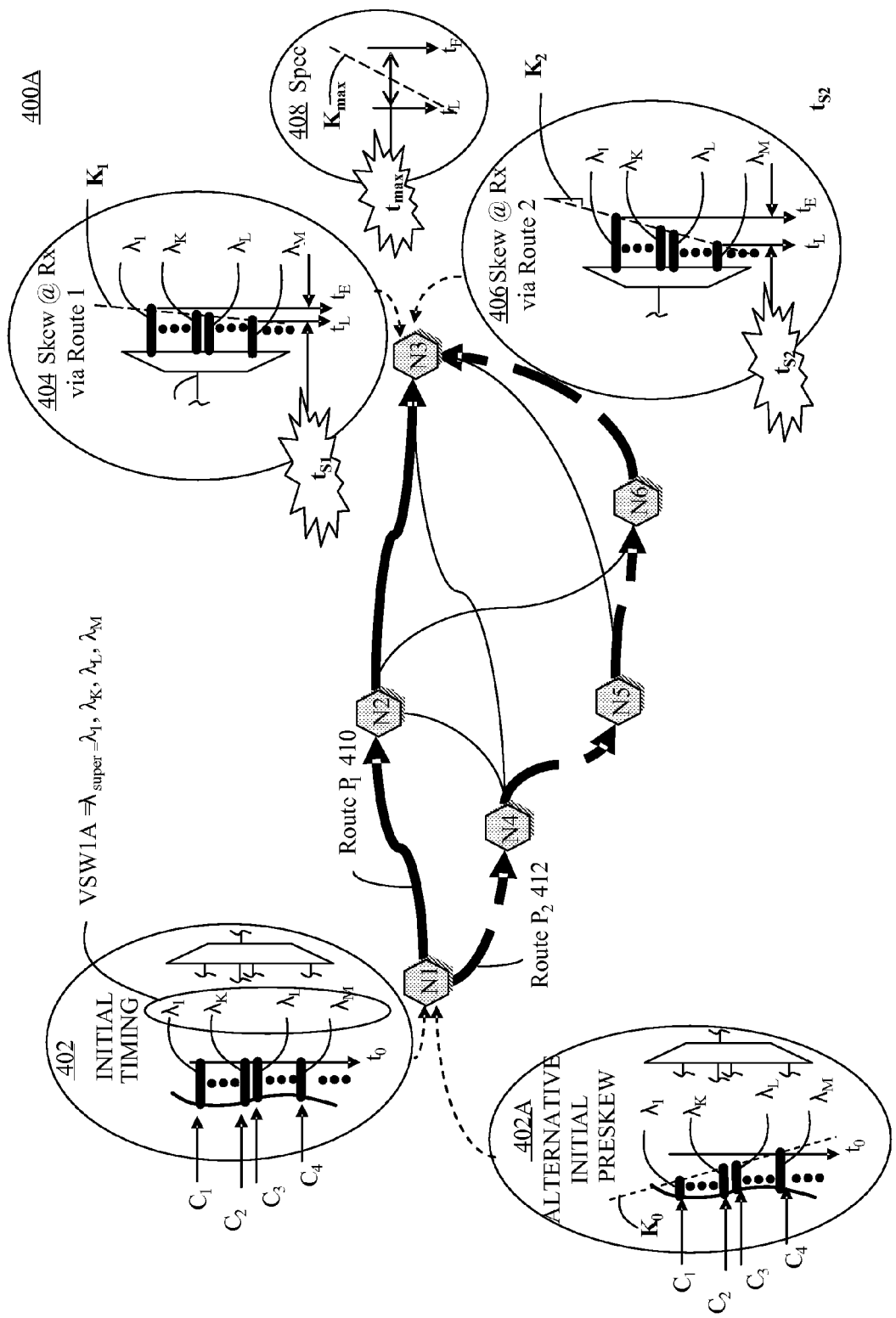
FIG. 4A is a network illustration of skew performance variation occurring over multiple communication paths via multiple routes, and the identification of the better route in terms of skew, in accordance with various aspects of the present invention.

Referring to FIG. 4A, a network illustration 400A of skew performance variation occurring over multiple communication paths and the identification of the better route in terms of skew is shown, in accordance with various aspects of the present invention. Initial timing of associated data can either be synchronized as shown in initial timing 402 at to, or can implement a preskew timing of signals 402A, wherein information on $\lambda_1$ is delayed relative to the other wavelengths. The group of wavelengths is increasingly delayed from $\lambda_1$ to $\lambda M$ of VSW1A relative to with a preskew dispersion slope $K_0$.

The allocation of data across the multiple routes is determined by the skew between the channels (e.g., $\lambda_1$, $\lambda_K$, $\lambda_L$, $\lambda_M$). If associated data signals are transmitted on route $P_1$ 410, then the resulting skew is the time difference between the earliest signal $t_E$ and latest signal $t_L$ occurring between the signals at their destination, node N3, illustrated as skew 404 (e.g., time $t_{s1}$) with an associated skew dispersion slope of $K_1$. Alternatively, if the associated data signals are transmitted via route $P_2$ at 412, there results at the destination node N3 a timing skew 406 is illustrated, such as $t_{s2}$, with an associated skew dispersion slope of $K_2$.

The skew associated with the different routes $P_1$ and $P_2$ may be analyzed at the destination node to select an optimal route. These different skews may also be compared to certain parameters 408, such as max allowable skew $t_{MAX}$, or maximum allowable skew slope $K_{MAX}$, in order to select a preferred route. The skew may also be analyzed at intermediate nodes to select an optimal route or identify that skew falls within parameters.

The evaluation of skew may identify that skew has fallen outside of a preferred specification or range, and initiate a skew adjusting procedure. The skew consideration of each link, or span, in the network may be considered and summed for analysis relative to the allowable skew tolerance for a given communication network specification or standard.

Figure 4B:
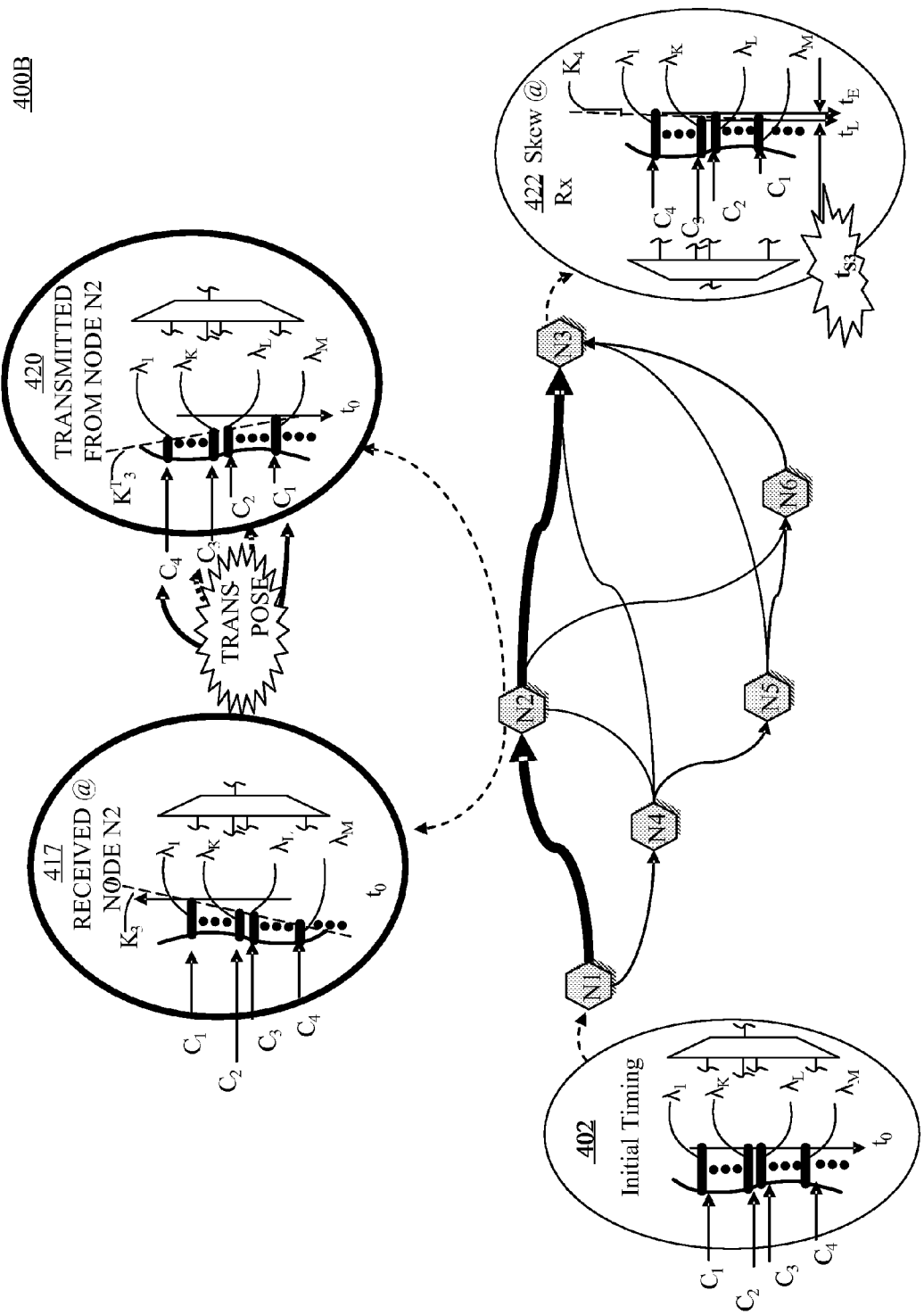
FIG. 4B is a network illustration of skew adjustment via wavelength reassignment of the multiple communication paths at a node between the source node and the destination node, in accordance with various aspects of the present invention.

Referring to FIG. 4B, a network illustration 400B of skew adjustment via wavelength reassignment of the multiple communication paths is shown in accordance with various aspects of the present disclosure. In these embodiments, a given client data signal is separated into four subsignals (e.g., signal portions $C_1$-$C_4$) to be routed on different communication paths over the network as associated data. Associated data means the multiple signals are associated with each other as being part of the original client data signal and are reassembled at a destination node to recreate the client data signal.

The format of the signal portions may depend upon the protocol of a given system such as protocols defining the distribution of payload, forward error correction ("FEC") data, overhead (OH) data, etc. Assuming initial timing 402 in FIG. 4B, if a set of associated data signals are determined to have unacceptable skew performance at the destination or any intermediate node, wavelength reassignment may be utilized to improve the skew performance in the nodal network.

At an intermediate node, for example, if the signal is wavelength-swapped, then skew occurring between high and low frequencies can be compensated by inversing the wavelengths where the longest wavelength is swapped for the shortest transmission wavelength and the next longer wavelength is swapped for a shorter wavelength. In effect, the wavelengths are reversed in a manner that previously longer wavelength signals are substituted with shorter wavelength signals. For example, signal portion $C_3$ and $C_2$ are rerouted to be carried on swapped frequencies (e.g., $C_3$ is now carried on $\lambda_K$ and C2 is now carried on $\lambda_L$). This can be accomplished by optical signal wavelength conversion, or by an optical-to-electrical-to-optical conversion that reassigns a signal portion to be transmitted on a channel with a different frequency laser.

If associated data signals are received at node N2 with dispersion slope $K_3$, as shown in the upper left side of FIG. 4B at 417, then the carrier wavelengths can be wavelength-swapped for a given set of associated data for a given client signal. Thus, if signal portions $C_1$-$C_4$ of a client signal are transmitted on carriers $\lambda_1$, $\lambda_K$, $\lambda_L$, and $\lambda_M$, respectively at source node N1, they can be transposed at intermediate node N2 to carriers $\lambda_M$, $\lambda_L$, $\lambda_K$, and $\lambda_1$, respectively, with new dispersion slope $K^T_3$ as seen at 420 in FIG. 4A. Wavelength reassignment in this embodiment assumes a linear dispersion slope of signal portions $C_1$-$C_4$ on carriers $\lambda_1$, $\lambda_K$, $\lambda_L$, and $\lambda_M$.

In an alternative embodiment, any signal portion can be reassigned to any carrier frequency, as best fits the overall skew reduction for the system, e.g., for non-linear channel performance as illustrated at 422 in FIG. 4A. After performing the wavelength reassignment, associated data $C_1$-$C_4$ is received at destination node N3 with a resultant adjusted, or minimized, skew 422 of $t_{s3}$, and associated nonlinear dispersion slope of $K_4$; a superior skew performance than the same signals would have had without the wavelength reassignment. Minimal skew is the resultant skew of the client signal portions at the destination node that meets the specified allowable skew tolerance for the system and that has been managed by the controller to provide either the least amount of skew available for the VSW or VWG on the available resources of the network or with a reasonable amount of skew in consideration for other performance tradeoffs.

Figure 4C:
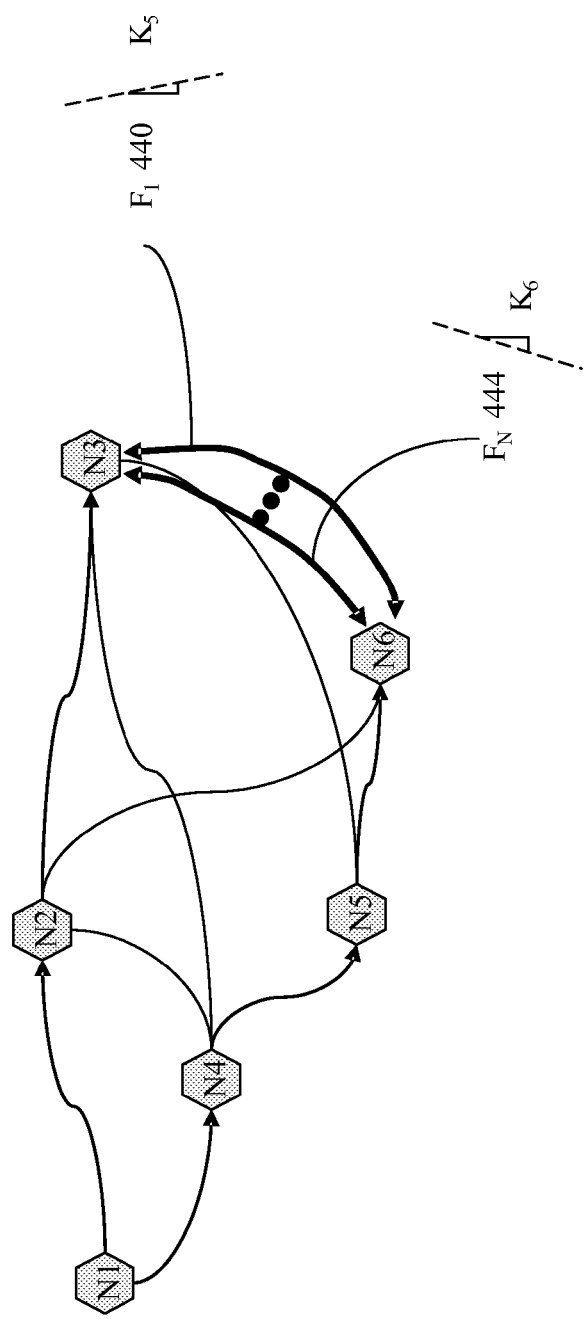
FIG. 4C is network illustration of skew adjustment via selection of one fiber from multiple fibers depending on the dispersion slope of the fiber, in accordance with various aspects of the present invention.

Referring now to FIG. 4C, a network illustration 400C illustrates skew adjustment via selection of one fiber from a possible group of different multiple fibers depending at least in part on the particular dispersion slope, $K_X$, of the fiber which is shown in accordance with various aspects of the present invention. Multiple optical fiber links, $F_1$ 440 to $F_N$ 444, are coupled between nodes N6 and N3, where each fiber may have different dispersion compensation slopes, $K_5$ and $K_6$, respectively. The multiple fiber route scenario via $F_1$ 440 to $F_N$ 444 is similar to multiple physical routes 410 and 412 involving different nodes in the network as illustrated in FIG. 4A. However in the present embodiment, there may not essentially be any diversity in fiber lengths of the fiber group between nodes N3 and N6 since these two nodes are at the same distance apart for any one fiber of the fiber group $F_1$ 440 to $F_N$ 444. Thus, a finer skew adjustment may be possible by considering only the nonlinear variations of the different fibers.

Figure 4D:
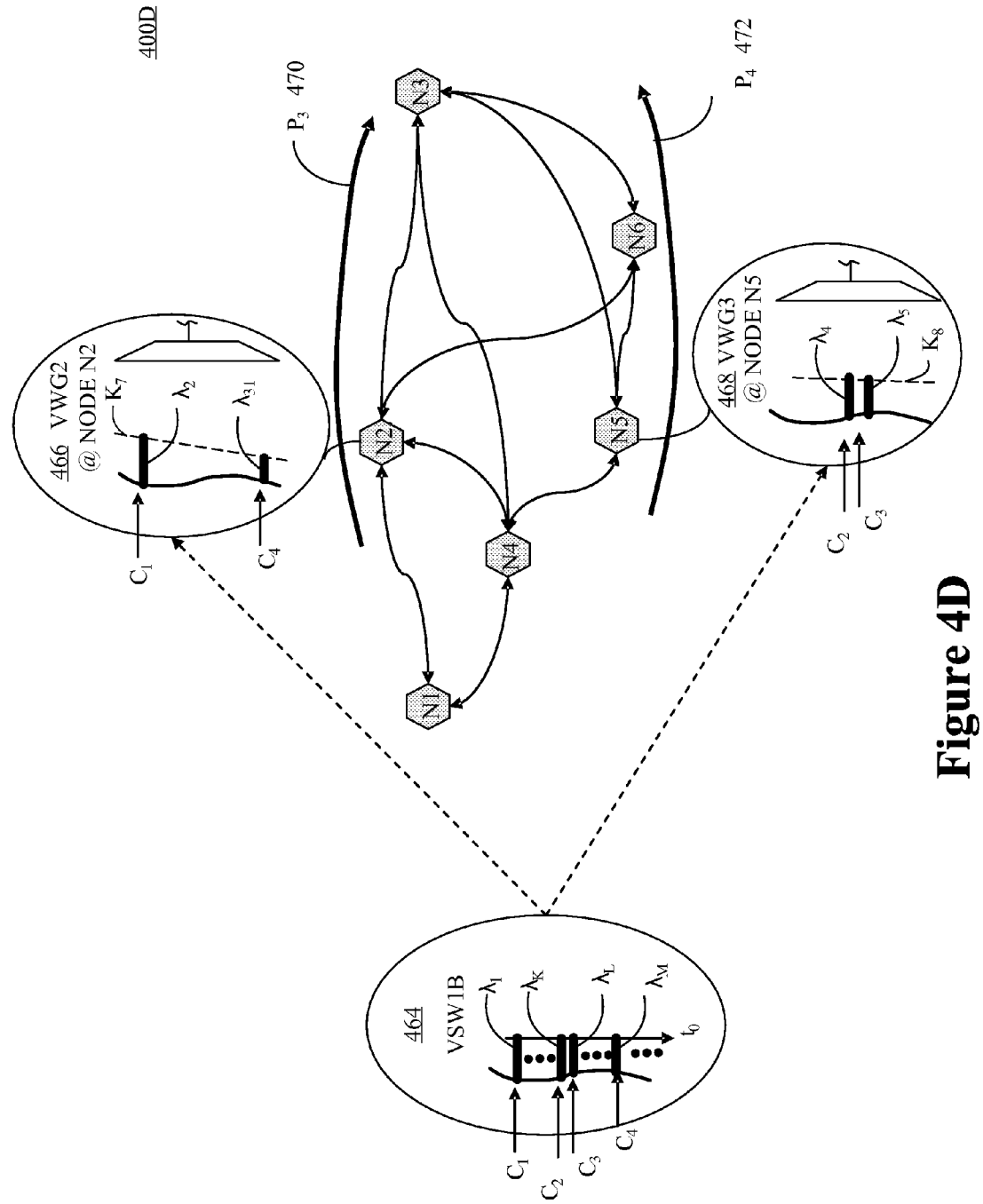
FIG. 4D is a network illustration of dividing a virtual super wavelength into multiple virtual wavelength groups and routing them on different routes on the network, in accordance with various aspects of the present invention.

Referring now to FIG. 4D, a network diagram illustrates a divided client signal into two routes in accordance with various aspects of the present invention. As defined above, a client signal may be routed as a virtual super wavelength ("VSW"); for example, the client signal is co-routed on multiple channels on the same path, the same nodes and/or fiber. If a VSW routing is not available, then the client signal may be routed along different routes on the network as two or more virtual wavelength groups ("VWG") (e.g. routed as multiple groups wherein each group of one or more channels is routed on the same path).

A VWG can be any size and grouping of signals as is appropriate for channel bandwidth between nodes, and that skew and other performance specifications allow. In the present example, associated data, VSW, is initially scheduled to be transmitted as associated client signal portions $C_1$-$C_4$ on carriers $\lambda_1$, $\lambda_K$, $\lambda_L$, and $\lambda_M$, where client signal portions $C_1$-$C_4$ refer to a portion of the client signal that is transmitted on any available carrier, e.g., $\lambda_1$, $\lambda_K$, $\lambda_L$, and $\lambda_M$. The specific content of $C_1$-$C_4$ and the specific wavelengths on any given path are decided by the controller, such as a central controller 302 or a node controller. Thus, as the traffic rate increases, the content distribution $C_1$-$C_4$ may vary across the respective carriers, e.g. $\lambda_1$, $\lambda_K$, $\lambda_L$, and $\lambda_M$. In fact, if the controller so evaluates it, the client signal may be adjusted from content distribution $C_1$-$C_4$ on carriers, e.g., $\lambda_1$, $\lambda_K$, $\lambda_L$, and $\lambda_M$ to content distribution $C_1$-$C_3$ on respective carriers, e.g. $\lambda_1$, $\lambda_K$, $\lambda_L$, and $\lambda_M$.

However, in this illustration, sufficient channel count, or bandwidth, was not available on path $P_3$ 470 between the source node N1 and the destination node N3 to co-route the entire client signal (e.g., client signal portions $C_1$-$C_4$) as a Virtual Super Wavelength, VSW1B 464. Consequently, the exemplary controller, evaluate the network demands (e.g., traffic load, network resources, bandwidths, etc.) and conclude that the VSW should be divided into two or more virtual wavelength groups. For example, VWG1 may be divided into client signal portions $C_1$ and $C_4$ on carriers $\lambda_2$ and $\lambda_{31}$ on transmitted on path $P_3$ 470, and wavelength group VWG2 may be divided into client signal portions $C_2$ and $C_3$ on carriers $\lambda_4$ and $\lambda_5$ on path $P_4$ 472. For simplicity, it is assumed that carrier wavelengths are consistent across the several spans shown, though carrier wavelength diversity can be used.

Note that in the present embodiment, client signal portions $C_1$ and $C_4$ are co-routed as one VWG2 on outer wavelengths $\lambda_2$ and $\lambda_{31}$, while client signal portions $C_1$ and $C_4$ are co-routed as another VWG3 on nominal wavelengths $\lambda_4$ and $\lambda_5$, similar to that illustrated in prior FIG. 4B. In this manner, skew of VWG2 at node N2 466 may undergo skew adjustment procedure because the more extreme frequency values, $\lambda_2$ and $\lambda_{31}$ of VWG2 will exhibit more skew, $K_7$, at node N2, than the nominal frequency values $\lambda_2$ and $\lambda_3$ of VWG3 with skew $K_8$ illustrated at N5 468. Thus, client signal portions C2 and C3 may not require skew adjustment between the source node and destination node.

Different quality of service signals may be routed in this manner to provide preferred performance characteristics. If client signal portions C2 and C3 are more time-sensitive, or contain more sensitive data, the portions may be transmitted on a preferred physical route, preferred carrier wavelength, preferred grouping, and/or preferred fiber (i.e., preferred with respect to minimized skew slope, signal dispersion, fiber dispersion, and resultant skew between client signal portions).

A client signal portion by itself, or a VWG, may be re-routed at a node to travel a different path. A re-routing of this sort is accomplished by communicating the client signal portion(s) to a multiplexing device, such as a band multiplexing module ("BMM") shown in subsequent FIG. 5, which subsequently multiplexes optical signals and communicates them to a given node. Rerouting of a VWG in the present disclosure is accomplished by switching in the electrical domain of a node and routing a client signal portion to a multiplexing module, whose function is to combine carrier frequencies within a given carrier group for transmission on a fiber medium, as shown in subsequent FIG. 5. If a client signal portion is switched to a different multiplexing module, then the same carrier wavelengths may be utilized for both VWGs, as they will not conflict on different multiplexing modules routing on different fiber links. If client portion signals are communicated on the same carrier wavelengths for different VWGs (e.g., on different paths) and if the client portion signals are to be combined or redistributed at a subsequent node, then any potential conflict of client signal portions on the same wavelength at that downstream node can be resolved by assigning appropriate non-conflicting wavelengths at the given node, as directed by the controller.

Figure 5:
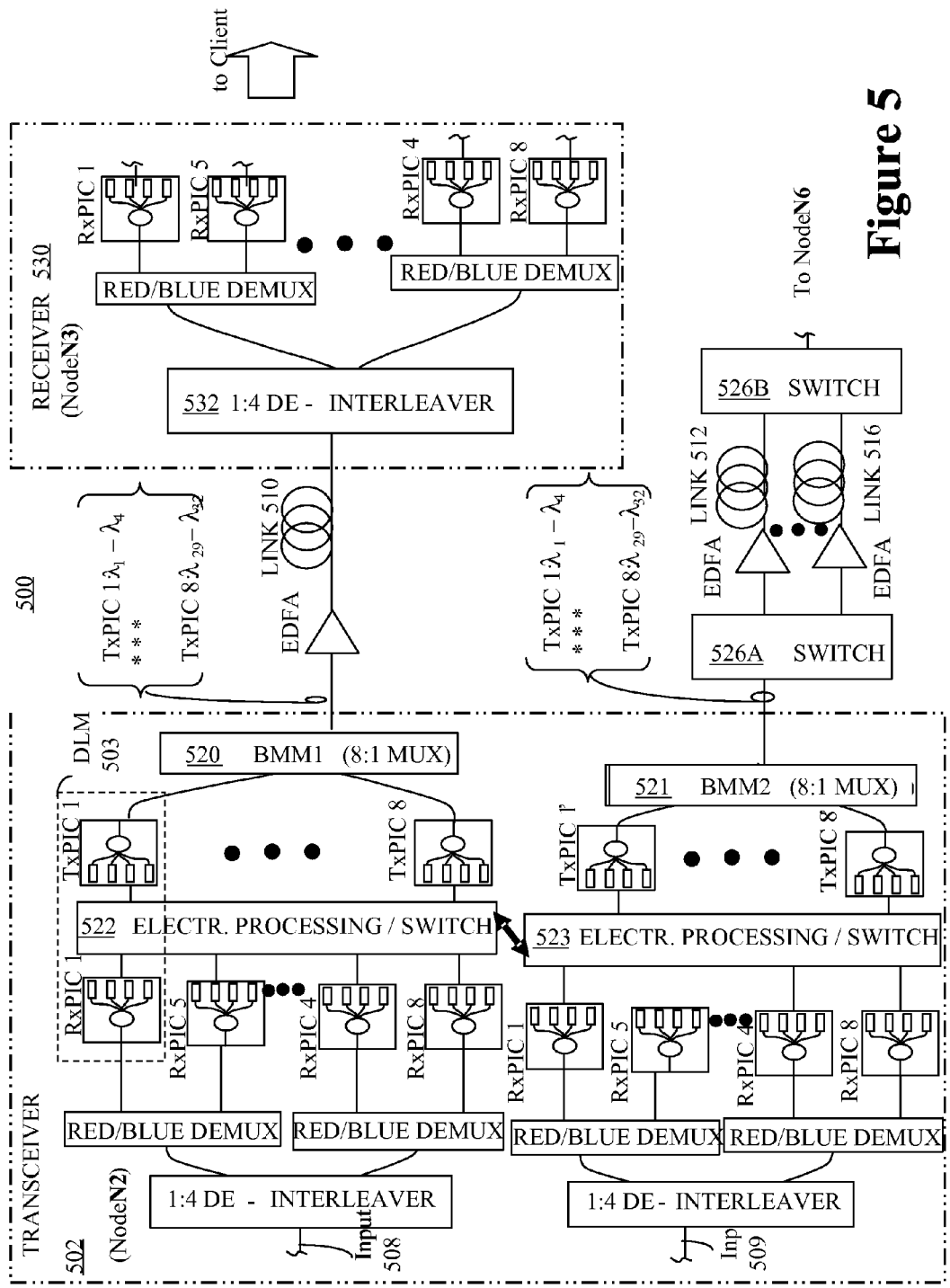
FIG. 5 is a schematic of a transceiver node with its internally coupled and switched band modules each coupled to different nodes for space diversity routing, in accordance with various aspects of the present invention.
Figure 6:
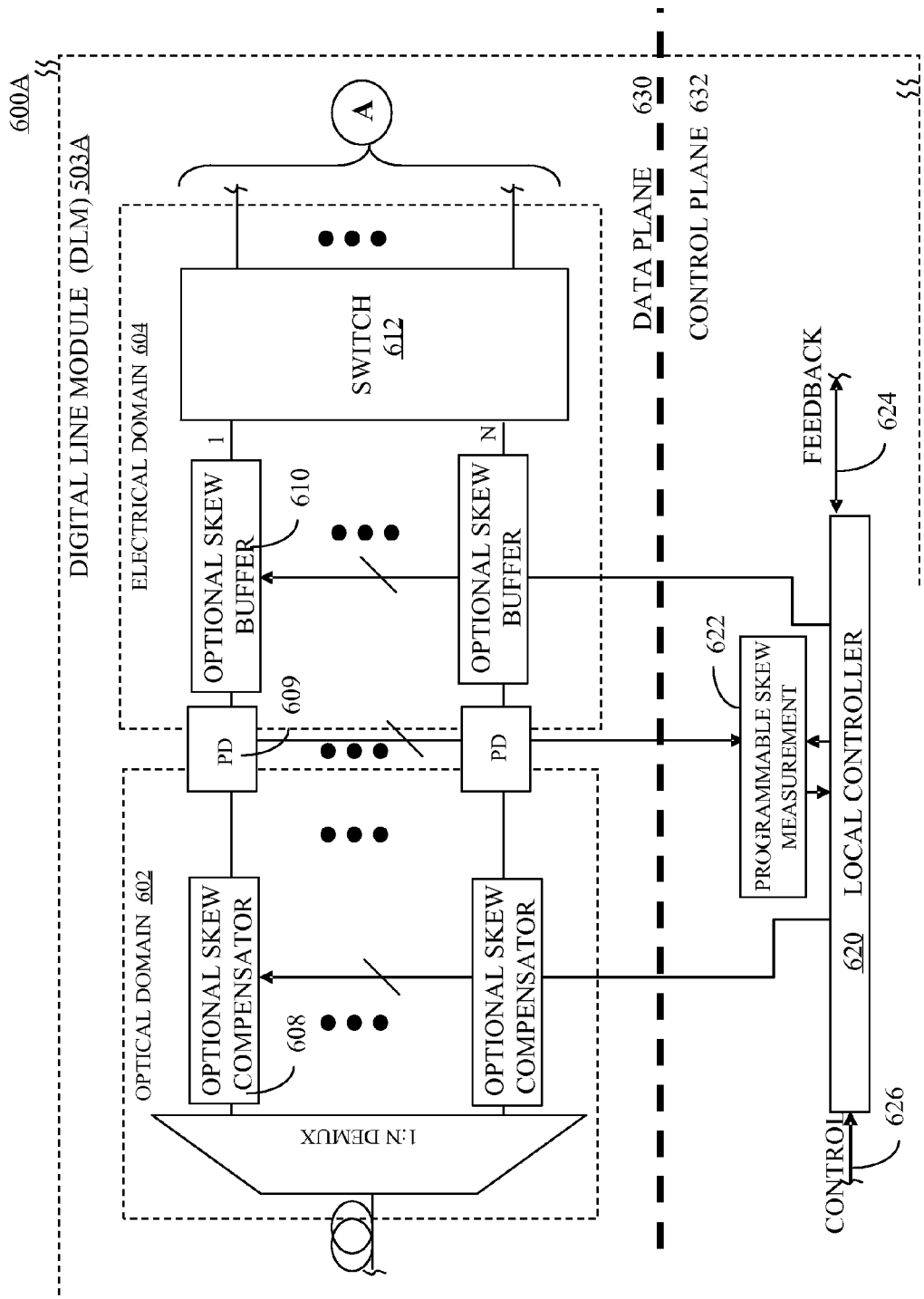
FIG. 6 is a schematic of a receiver portion of a line module wherein the receiver has optical skew compensation with electronic skew measurement and buffer, in accordance with various aspects of the present invention.
Figure 7:
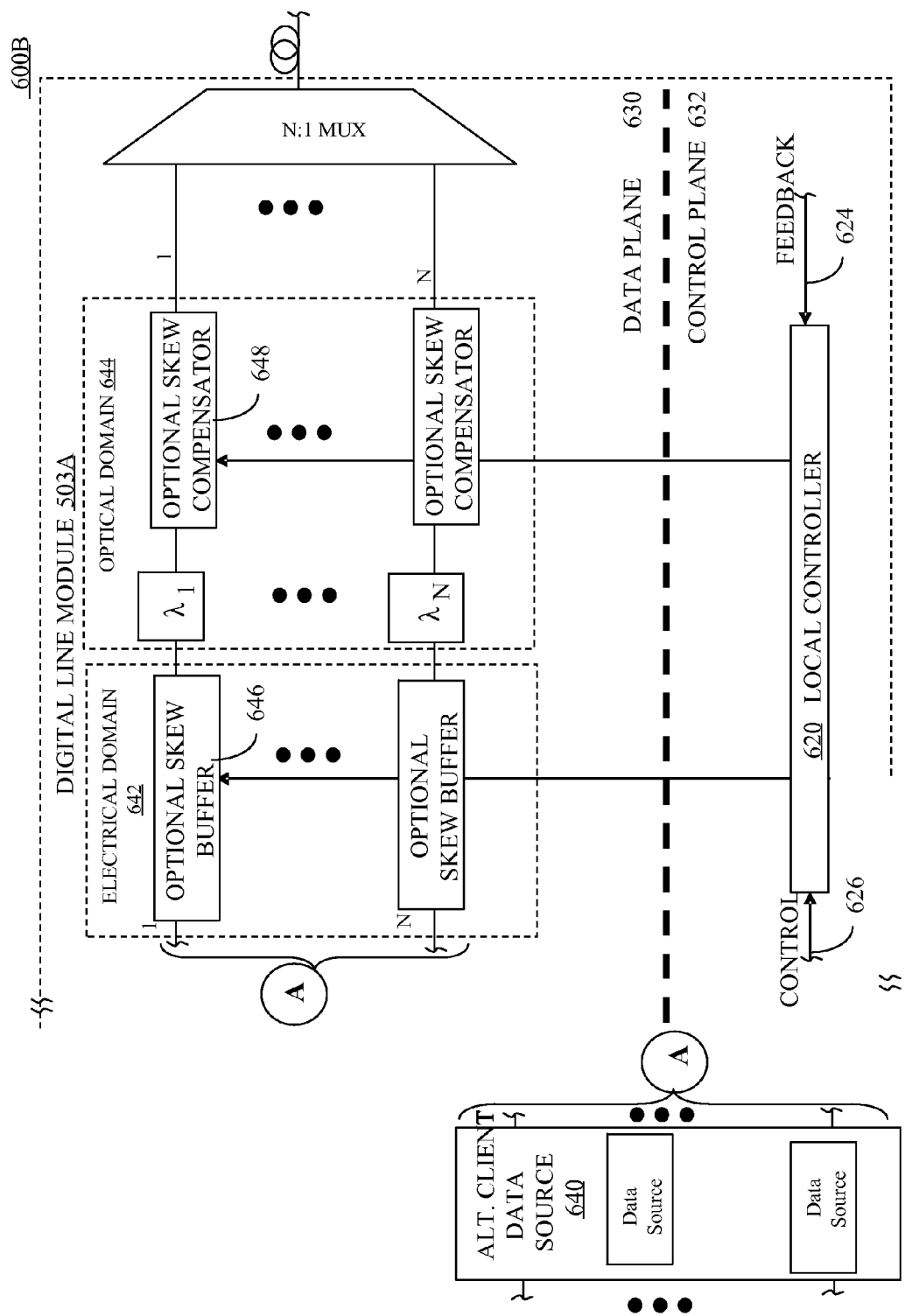
FIG. 7 is a schematic of a transmitter portion of a line module wherein the transmitter has optical skew compensation and electronic skew measurement and buffer, in accordance with various aspects of the present invention.

In FIGS. 5-7, a novel switching function in a node of a network is illustrated in accordance with various aspects of the present invention. The switching function allows rerouting of a portion of information, such as a portion of a client signal, on a different wavelength, different fiber, and/or to a different node. Rerouting can be managed so as to provide for skew adjustment in order to provide better quality of service of the overall information transmitted over the network.

FIGS. 5-7 also illustrate an apparatus for implementing the skew adjustment within an exemplary node that also employs optical to electrical to optical ("OEO") conversion. Once in the electrical domain, client signals enjoy the benefits of digital signal processing, switching (channel and band allocation), and signal regeneration that correspond to electronically implemented functions. However, the present invention is also well suited to performing functions off frequency translation/conversion for purposes of rerouting in the optical domain, e.g. using a PIC, PLC, or discrete electro-optical and optical devices. For example, a nonlinear process in semiconductor optical amplifiers ("SOAs") or a highly nonlinear fiber could be utilized to satisfy frequency translation/conversion needs. Additional detail on the design, function and architecture of the TxPIC, RxPIC and DON can be found in U.S. patent application Ser. Nos. 10/267,331, 10/267,212, and U.S. Pat. No. 7,116,851, all of which are incorporated by reference in their entirety.

Referring in particular to FIG. 5, system 500 includes a transceiver node 502 coupled to receiver 530 and coupled to Node N6 (not shown) via switches 526A and 526B in accordance with various aspects of the present invention. Transceiver node 502 is coupled to one or more multiplexing modules, such as band multiplex modules ("BMM"), each coupled to different nodes for space diversity routing. Transceiver node 502 correlates to exemplary node N2 from FIGS. 4A-4D, and has a portion of communication paths from the WDM signal outputs from TxPIC1 through TxPIC8 coupled via BMM1 520 and fiber link 510 to a downstream receiver 530 and its BMM 532 correlated to exemplary node N3 from FIGS. 4A-4D.

Transceiver node 502 is a multi-channel device with multiple DLM 503 modules each of which contain an RxPIC and a TxPIC, a group of which are coupled into a band MUX module ("BMM") that multiplexes the range of wavelengths (e.g., TxPIC1 $\lambda_1$ through TxPIC8 $\lambda_{32}$) into a WDM signal for transmission on fiber link 510 to a downstream node. Inputs 508 and 509 are coupled from upstream nodes in the communication network. Within each DLM, electronic processing and switching blocks 522 and 523 provide options to manage the transmitted information in the electrical digital domain, including skew management functions, described in more detail in subsequent figures. While all the wavelengths processed by transceiver 502 may be within in the C-band, this band may be divided between a red portion of the C-band, to represent lower wavelengths in the signal spectrum, and the blue portion of the C-band, to represent higher wavelengths in the signal spectrum. While the present embodiment constrains the spectrum of wavelengths for transmission within the C-band, the present invention is well-suited to using any combination and location of wavelengths such as utilizing multiple bands, e.g., L-band, S-band, any other band or to utilizing divisions within a band, for communication path diversity.

In certain embodiments, two nodes may be coupled via multiple fibers that can be selected for their different skew properties, such as their different dispersion properties between channels that will allow carriers at different wavelengths to arrive at a downstream node at different times. Transceiver node 502 has BMM2 521 coupled to node N3 via switch 526A and 526B on either end of the multiple links 512 through 516, which correlate, for example, to fiber $F_1$ 440 through fiber $F_N$ 444 of FIG. 4C, with different dispersion slopes K5 through K6, respectively. Switches 526A and 526B are any switch, that functions to couple one of the multiple fibers to each node, such as by an external 1×N mechanical switch, thermo-optic optical switch, or micro-electrical-mechanical ("MEMs") switch.

Referring now to FIGS. 6 and 7, a more detailed illustration of an exemplary transceiver digital line module ("DLM") 503A is presented in two parts, with FIG. 6 illustrating a receiver portion of the DLM, and FIG. 7 illustrating a transmitter portion of the DLM. DLM 503A in FIGS. 6 and 7 correspond to DLM 503 block portion of the transceiver 502 shown in FIG. 5. Output A from receiver portion of DLM is received as input A at the transmitter portion of DLM.

Referring specifically to FIG. 6, a schematic of a receiver portion 600A of a digital line module 503A is shown wherein the receiver has optical skew compensation, with electronic skew measurement and skew buffer in accordance with various aspects of the present invention. Receiver portion of DLM 503A has an optical domain 602 with customary components such as 1:N DEMUX and an array of photodetectors (PDs) for $\lambda_1$ to $\lambda_N$.

Certain embodiments provide coupling from the photodetectors to a programmable skew measurement device 622. The skew measurement device is enabled to capture skew measurements via a comparator (e.g., a differential sense amplifier, and other digital signal processing techniques) that correlates the output from a photodetector with a predetermined bit pattern. The bit pattern is replicated in a marker of a test signal transmitted to the DLM 503A during a learning mode for the network. Skew measurement device 622 has multiple instances of correlation ability along with a local clock input for measuring the difference in time from receipt of the marker for each of the multiple channels $\lambda_1$ to $\lambda_N$. Alternatively, programmable skew measurement device 622 may include the capability to perform a relative comparison measurement between any two wavelengths at a given time for comparison testing. This pattern can be repeated for different wavelengths, as directed by local controller 620, in combination with a central network controller.

Local controller 620 is coupled to skew measurement device 622, in the control plane 632, to provide initiation signals for test mode, selection of wavelengths to measure, and reception of skew data. Local controller 620 in the current node is coupled via a unidirectional or bidirectional line 624 to other nodes in the network to share skew data measurements, skew resource status, skew needs, and skew resource allocation.

Besides providing skew measurement control, various nodes in these embodiments of the invention provide an optional skew compensator 608 for each channel in the optical domain 602 of the node and optional skew compensator 610 in the electrical domain 604. Skew buffer 608 may be any optical device with delay properties, such as a ring resonator. In various embodiments, an optional skew compensator is provided for only a portion of the signal channels in the DLM 503A, such as on channels on which signals propagate at a higher rate per unit time, such as those on lower frequency channels. In other embodiments, optional skew compensator has a bypass that is enabled via local controller 620 if no skew adjustment is needed. Lastly, in another embodiment, no optical skew compensation is used because of higher cost, and sufficient capability of skew adjustment via routing, and/or buffering in the electrical domain.

Similar to optical skew buffer 608, an optional electronic skew compensator 610 may be any buffer medium, such as a first-in-first-out ("FIFO") memory buffer, which delays the information on the given channel. In different embodiments, the optional electronic skew compensator 610 can be implemented on all channels, or only on a fraction of the channels. The optional optical skew compensator 608 can be programmable to allow a variable amount of delay on the information transmitted thereon, with a bypass to reduce any incidental propagation delay that the device may exhibit even if no skew compensation is desired. Additionally, the optional electronic skew compensator 610 may be located anywhere within the optical networking system, including at transmitting nodes, receiving nodes and intermediary nodes. After the appropriate buffering in the receiver, the electrical signals are communicated to switch 612, which can be any form of switch, such as cross-point switch, which enables rerouting of information signals from one channel, or wavelength, to another channel, or wavelength.

Referring specifically to FIG. 7, a schematic of a transmitter portion of a line module 600B is shown wherein the transmitter has optical skew compensation and electronic skew buffer in accordance with various aspects of the present invention. Transmitter receives the electrical signals 'A' from the receiver of FIG. 6 or alternatively from a client data source 640, such as an add channel. Transmitter portion of DLM 503A also has electrical domain portion 642 and optical domain portion 644, with respective optional optical skew buffer 646, and optional electronic skew compensator 648. DLM 503A can utilize any combination of these delay devices in the transmitter and receiver as is applicable for a given design or application depending on the level of skew variation exhibited in the network. Optional buffers for FIGS. 6 and 7 are dedicated, distributed in-line buffers in the present embodiment. However, in-line buffers can also be a centralized, shared memory buffer, albeit with latency, cost, and flexibility tradeoffs.

Figure 10:
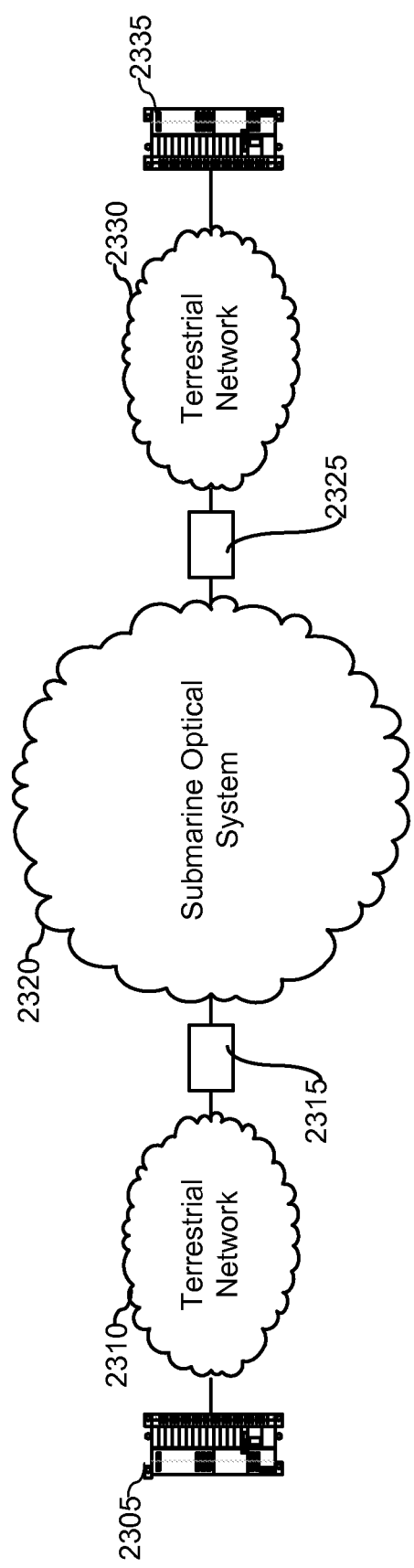
FIG. 10 is an optical system comprising both terrestrial and submarine optical networks according to various embodiments of the present invention.

Increased bandwidth that can be gained from co-routing signal portions as described can be particularly advantageous in submarine optical systems, for example, in communicating between continents where the communication spans large bodies of water. FIG. 10 illustrates an exemplary multi-network, trans-oceanic optical system in which skew compensation is realized at various locations along the signal path including pre-compensation, intermediary compensation, and post-compensation. In addition, the location and frequency of skew compensation modules may depend on the number and diversity of the service providers involved in the multi-network trans-oceanic system.

Figure 8:
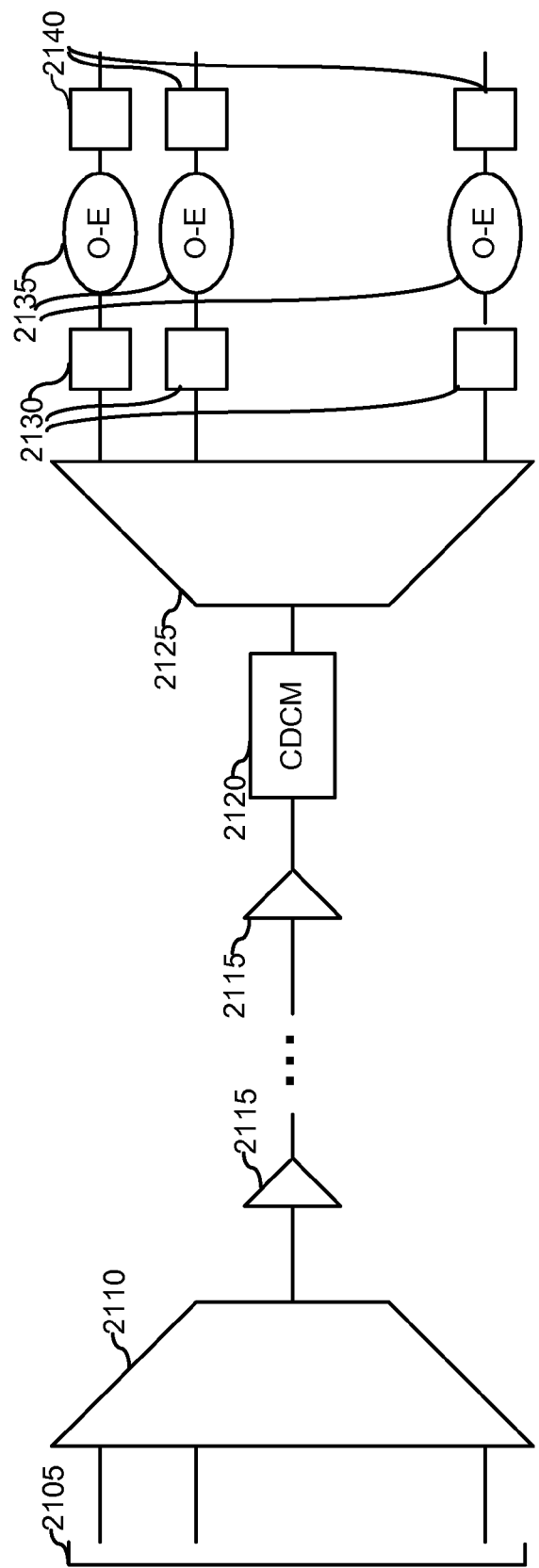
FIG. 8 is an optical system having both dispersion compensating elements and skew compensating elements according to various embodiments of the present invention.

FIG. 8 illustrates generally a system in which both dispersion and skew post-compensation are performed at a receiver side of an optical system according to various embodiments of the invention. It is important to note that the skew management functions and structures previously described above may be employed within this network at various locations. For example, the network may be installed, configured and managed at transmission nodes, intermediary nodes and/or receiver nodes to improve the differential latency between channels within the system.

On the transmission side of the system, a plurality of channels 2105 is optically multiplexed, via multiplexer 2110, to generate a WDM signal. The WDM signal is communicated along the optical span having multiple optical amplifiers or regenerators 2115 that keep the WDM signal power within a preferred range. A coarse dispersion compensation module 2120 is coupled to receive the WDM signal after having traversed all or substantially all of the optical span. The coarse dispersion compensation module 2120 compensates for dispersion effects on the WDM signal along the span, which causes signal degradation. In various embodiments of the invention, the coarse dispersion compensation module 2120 comprises dispersion compensating fiber or fibers that reduce the dispersive characteristics of the WDM signal. As the WDM travels through these dispersion compensating fiber(s), the shape of the signal is improved resulting in a better signal-to-noise ratio.

One skilled in the art will recognize that various compensating systems may be realized with different types and combinations of dispersion compensating fibers. Because the coarse dispersion compensation module 2120 compensates for dispersion across the channels of the WDM signal (i.e., the WDM signal is multiplexed), targeting certain channels within the WDM signal for dispersion compensation is difficult. Accordingly, certain embodiments of the invention provide for additional fine dispersion compensation at a channel granularity.

An optical demultiplexer 2125 separates the WDM signal into individual channels, optical signal groups, or a combination thereof. A plurality of fine dispersion compensation modules 2130 receive optical channels or optical signal groups and further apply dispersion compensation thereon. In certain embodiments of the invention, each fine dispersion compensation module 2130 is designed to compensate a certain channel or group of channels. Dispersion compensation fiber may be used within the plurality of fine dispersion compensation modules 2130.

The coarse dispersion compensation module 2120 and the fine dispersion compensation module 2130 introduce additional latency within the WDM signal. These latency effects become even more detrimental when the added latency is not spread evenly across each of the channels. In such situations, this uneven addition of latency further increases the amount of skew between one or more of the channels resulting in a more complex and demanding reassembly procedure if not address prior thereto.

Each of the dispersion compensated channels is converted into the electrical domain by a plurality of optical-to-electrical converters 2135. These converters 2135 may include PIN diodes, photoavalanche diodes, or other converters known to one of skill the art. The resulting electrical signals are provided to a plurality of skew compensating modules 2140 that adjust the differential latency between the channels so that a signal, transmitted across at least two of the channels, may be more efficiently rebuilt. This skew compensation may be achieved by effectively introducing additional latency within one or more of the channels by performing a post-buffering operation thereon. One skilled in the art will recognize that the buffer size in each of the skew compensating modules 2140 may be adjusted to enable compensation of more or less skew.

As previously discussed, skew is potentially introduced into a client signal as the channels within the WDM signal travel across the optical span and are processed within dispersion compensation modules (e.g., 2120, 2130). This skew may be compensated on the transmission side of the optical signal by pre-buffering one or more of the channels within the WDM signal, by buffering one or more of the channels within the WDM signal at an intermediary node, or post-buffering one or more of the channels at the skew compensating modules 2140, or any combination thereof. According to various embodiments of the invention, the skew compensating modules 2140 may also provide skew analysis functionality in which skew across the channels is monitored. If the skew falls outside of a desired range, a skew compensating module 2140 may generate an alarm and/or dynamically re-allocate the channels to improve the skew. Furthermore, as detailed in FIG. 9, the skew compensating modules 2140 may also be divided into coarse and fine skew compensating modules.

Although skew compensation has been described as being performed in the electrical domain, one skilled in the art will recognize that skew compensation may also be done in the optical domain. For example, additional latency may be added to one or more channels by using an optical buffer, such as a fiber coil, to add this latency.

Figure 9:
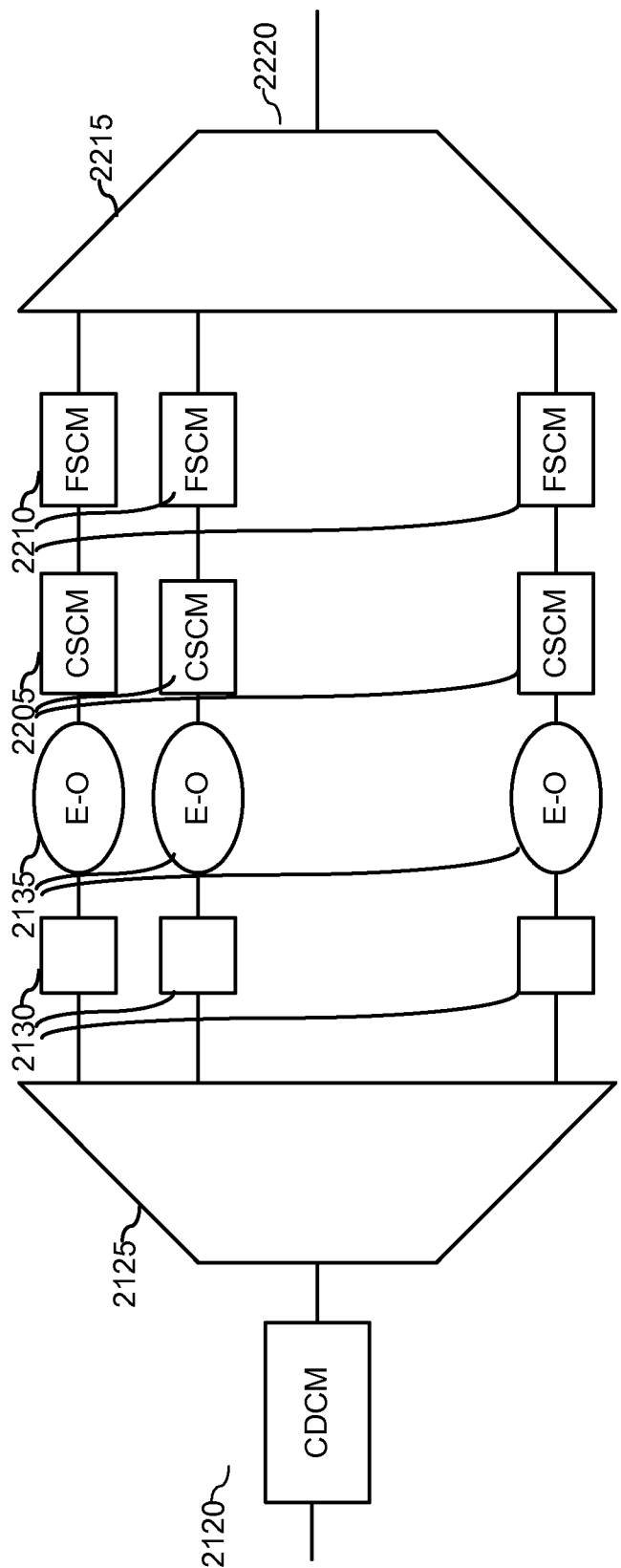
FIG. 9 is an optical receiver system in which dispersion and skew compensation is performed according to various embodiments of the present invention.

FIG. 9 illustrates a more detailed diagram of a receiver node within a trans-oceanic optical system according to various embodiments of the invention. The node comprises a coarse dispersion compensation module 2120 that compensates dispersion across the WDM signal as previously discussed. An optical demultiplexer 2125 optically separates the WDM signal into individual channels or optical signal groups, after which a plurality of fine dispersion compensation modules refine the dispersion compensation at a finer granularity. After being converted into electrical channels by converters 2135, the skew across the electrical channels is first coarsely adjusted and then finely adjusted.

In various embodiments of the invention, the electrical channels are provided to a plurality of coarse skew compensating modules 2205. These modules 2205 provide a coarse adjustment of differential latency between at least two of the electrical channels. This reduction of differential latency may be achieved by buffering one or more of the electrical channels for a set period of time, which effectively reduces the corresponding skew or differential latency between the electrical channels. A plurality of fine skew compensating modules 2210 further refines the skew compensation across certain channels. In certain embodiments of the invention, the plurality of fine skew compensating modules 2210 analyze certain skew characteristics remaining after the coarse skew adjustment and further adjust the channels to further improve the corresponding skew. One skilled in the art will recognize that either or both of the coarse skew compensating modules 2210 and the fine skew compensating modules 2215 may be integrated with other electrical components within the node. For example, the fine skew compensating modules 2215 may be integrated within an electrical multiplexer 2215 that combines one or more electrical channels into a client signal.

Further electrical components or modules may be provided within the signal paths that analyze, modify or otherwise process these compensated electrical channels. These electrical components may or may not be located between the coarse skew compensating modules 2210 and the fine skew compensating modules 2215.

Using the compensated electrical signals, a client signal 2220 is transmitted from the electrical multiplexer 2215 and is generated by combining one or more of the electrical signals into a relatively higher data rate signal. This combination of electrical signals is less demanding if there is little or no skew between its component electrical channels.

FIG. 10 illustrates an exemplary multi-network, trans-oceanic optical system in which skew compensation is realized at various locations along the signal path including pre-compensation, intermediary compensation, and post-compensation. In addition, the location and frequency of skew compensation modules may depend on the number and diversity of the service providers involved in the multi-network trans-oceanic system.

Referring to FIG. 10, a transmitting node 2305 transmits and/or receives information from a first terrestrial network 2310. A first landing node 2315 interfaces the first terrestrial network 2310 with a submarine optical system 2320. A second landing node 2325 interfaces the submarine optical system 2320 with a second terrestrial network 2330, which is connected to a receiver node 2335. In this type of system, skew compensation may be realized at various locations including the transmitting node 2305, the first landing node 2315, the second landing node 2325, and the receiver node 2335.

In various embodiments of the invention, pre-skew compensation is performed exclusively on the transmitting node 2305, which compensates for skew across the first terrestrial network 2310, the submarine optical system 2320, and the second terrestrial network 2330. These embodiments may be more typical if a service provider is using a third-party submarine optical system to inter-connect terrestrial networks and does not have control of the landing nodes of the submarine optical system.

In other embodiments, skew compensation may be diversified throughout the system in which the first and/or second landing nodes 2315, 2325 further comprise skew compensation modules. Such a diversification allows a relatively lower amount of pre-compensation to be performed on the transmitting node 2305 and a relatively lower amount of post-compensation to be performed on the receiver node 2335. Additionally, this diversification may also provide early fault or error detection if skew becomes too large at some point within the system.

One skilled in the art will recognize that the above-described method for calculating latency across diverse paths may be applied to any number of paths greater than two. Additionally, the method may be applied to any type of network including, but not limited to, submarine, trans-oceanic optical systems.

Figure 11:
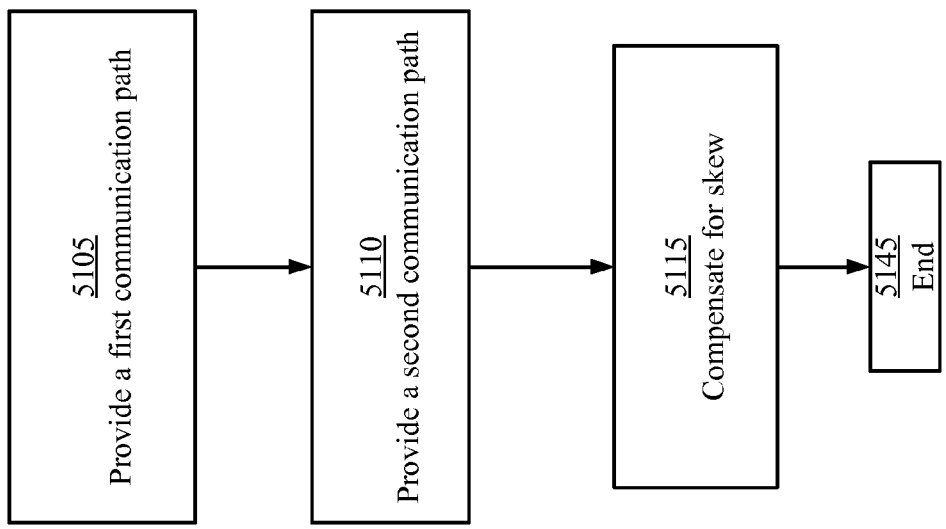
FIG. 11 is a flowchart of a process to compensate for skew in a networking system, in accordance with various aspects of the present invention.

The flowchart in FIG. 11 describes a method, independent of structure, which may be implemented in various embodiments of the invention. FIG. 11 is a flowchart of a process to compensate for skew in accordance with various aspects of the present invention. A first and a second path are provided 5205 and 5210. The skew relative to the two paths can be adjusted or compensated 5215. The skew can be adjusted using any of the methods described herein.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

What is claimed is:

1. A networking system comprising:
a transmission node that includes a first optical transmitter and a second optical transmitter that output first and second optical signals, respectively, the first optical signal carrying a first portion of a data signal and the second optical signal carrying a second portion of the data signal, the first and second optical signals having first and second wavelengths, respectively, such that the first and second portions of the data signal are output from the transmission node at substantially the same time;
an intermediate node, the first portion of the data signal arriving at the intermediate node prior to the second portion of the data signal, the intermediate node including:
an optical demultiplexer that receives the first and second optical signals and supplies the first optical signal and the second optical signal from first and second outputs, respectively;
a first converter that converts the first optical signal to a first electrical signal;
a second converter that converts the second optical signal to a second electrical signal;
a first skew compensating module coupled to the first converter that adjusts a first skew associated with the first electrical signal by a first amount of delay;
a second skew compensating module coupled to the first skew compensating module that further adjusts the first skew by a second amount of delay less than the first amount of delay;
a third skew compensating module coupled to the second converter that adjusts a second skew associated with the second electrical signal by a third amount of delay;
a fourth skew compensating module coupled to the third skew compensating module that further adjusts the second skew by a fourth amount of delay less than the third amount of delay; and
an electrical multiplexer coupled to the second and fourth skew compensating modules that multiplexes the skew adjusted first and second electrical signals, the skew adjusted first and second electrical signals being output from the second and fourth skew compensating modules, respectively.

2. The networking system of claim 1 wherein the first optical signal is transmitted on a first channel and the second optical signal is transmitted on a second channel.

3. The networking system of claim 1 wherein the skew compensation module comprises a buffer.

4. A network system, comprising:
first and second optical transmitters that output first and second optical signals, respectively;
an input that receives the first and second optical signals, the first and second optical signals having first and second wavelengths, respectively, the first optical signal carrying a first data signal portion and the second optical signal carrying a second data signal portion, such that the second data signal portion is supplied to the input after the first data signal portion;
a skew compensation module,
including:
an optical demultiplexer that receives the first and second optical signals and supplies the first optical signal and the second optical signal from first and second outputs, respectively;
a first converter that converts the first optical signal to a first electrical signal;
a second converter that converts the second optical signal to a second electrical signal;
a first skew compensating module coupled to the first converter that adjusts a first skew associated with the first electrical signal by a first amount of delay;
a second skew compensating module coupled to the first skew compensating module that further adjusts the first skew by a second amount of delay less than the first amount of delay;
a third skew compensating module coupled to the second converter that adjusts a second skew associated with the second electrical signal by a third amount of delay;
a fourth skew compensating module coupled to the third skew compensating module that further adjusts the second skew by a fourth amount of delay less than the third amount of delay; and
an electrical multiplexer coupled to the second and fourth skew compensating modules that multiplexes the skew adjusted first and second electrical signals, the skew adjusted first and second electrical signals being output from the second and fourth skew compensating modules, respectively.

5. The transceiver of claim 4 wherein the skew compensation module is configured to maintain the first and second skew below a skew threshold.

6. A method comprising:
transmitting from a first optical transmitter a first optical signal having a first wavelength and carrying a first data signal portion;
transmitting from a second optical transmitter a second optical signal having a second wavelength and carrying a second data signal portion,
receiving, at an intermediary node, the first optical signal;
receiving, at the intermediary node, the second data signal portion after the first data signal portion;
supplying the first optical signal and the second optical signal from first and second outputs, respectively, of an optical demultiplexer;
converting the first optical signal to a first electrical signal;

converting the second optical signal to a second electrical signal;

adjusting a first skew associated with the first electrical signal by a first amount of delay;

further adjusting the first skew by a second amount of delay less than the first amount of delay;

adjusting a second skew associated with the second electrical signal by a third amount of delay;

further adjusting the second skew by a fourth amount of delay less than the third amount of delay; and electrically multiplexing the skew adjusted first and second electrical signals output from the second and fourth skew compensating modules, respectively.

* * * * *